United States Patent [19]
Hoeft

[11] Patent Number: 6,003,236
[45] Date of Patent: Dec. 21, 1999

[54] TOOL FOR MOUNTING A CHAIN ON A SPROCKET

[76] Inventor: Douglas A. Hoeft, 1135 Dogwood La., Waukesha, Wis. 53186

[21] Appl. No.: 09/036,904

[22] Filed: Mar. 9, 1998

[51] Int. Cl.[6] .................................................... G01B 5/00
[52] U.S. Cl. ............................................... 33/533; 33/203
[58] Field of Search .............................. 33/202, 203, 412, 33/533, 613, 645; 7/125, 169

[56] References Cited

U.S. PATENT DOCUMENTS

| | | | |
|---|---|---|---|
| 3,823,914 | 7/1974 | Coil | 254/78 |
| 3,956,829 | 5/1976 | Moxon | 33/203 |
| 4,423,556 | 1/1984 | DiVelez | 33/412 |
| 4,672,751 | 6/1987 | Jones | 33/286 |
| 4,745,827 | 5/1988 | Kuwica | 33/202 |
| 4,868,993 | 9/1989 | Kvale | 33/533 |
| 4,910,986 | 3/1990 | Funkhouser | 33/203 |
| 5,003,656 | 4/1991 | Loppnow | 7/169 |
| 5,193,283 | 3/1993 | Hsiao | 33/203 |
| 5,201,782 | 4/1993 | Bartlett | 33/203 |
| 5,371,953 | 12/1994 | Nower et al. | 33/533 |

*Primary Examiner*—Christopher W. Fulton
*Assistant Examiner*—Quyen Doan
*Attorney, Agent, or Firm*—Godfrey & Kahn, SC

[57] ABSTRACT

A hand-held tool is provided for use in mounting a de-railed chain onto a multi-toothed chain sprocket. The tool includes a two-part clamping member with an attached handle. When the two sections are brought together, grooves on the inner surfaces mate to form a series of bores that are sized to receive the teeth of the chain sprocket therethrough. In use, the tool is placed onto the chain sprocket with the sprocket teeth extending through the bores and the de-railed chain resting on the handle. The tool is tilted upward to slide the chain onto the clamping member and the extended teeth of the sprocket. The fastener(s) holding the two sections of the clamping member together is then disengaged and the tool is removed from the sprocket, with the chain re-mounted on the chain sprocket.

17 Claims, 6 Drawing Sheets

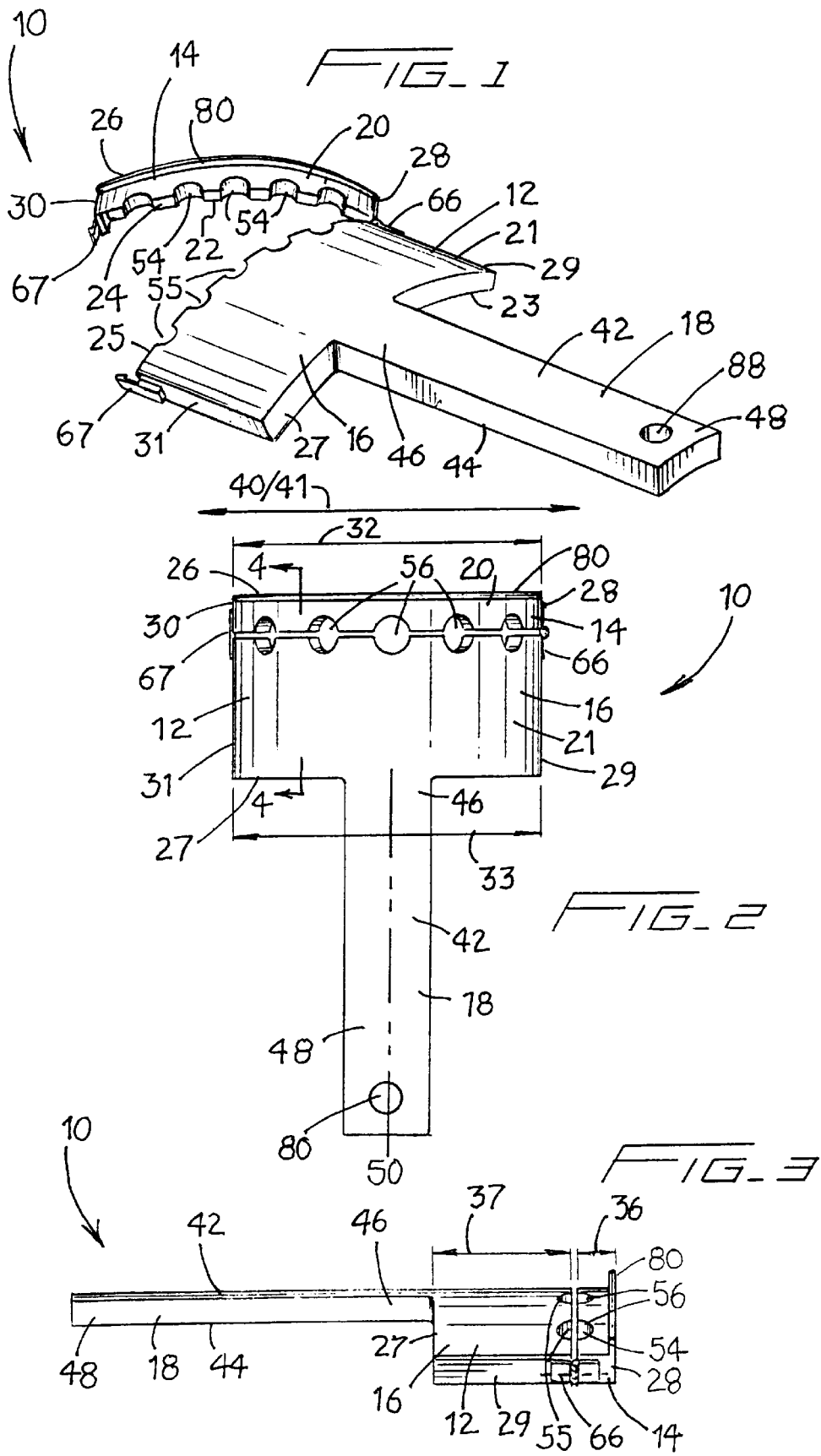

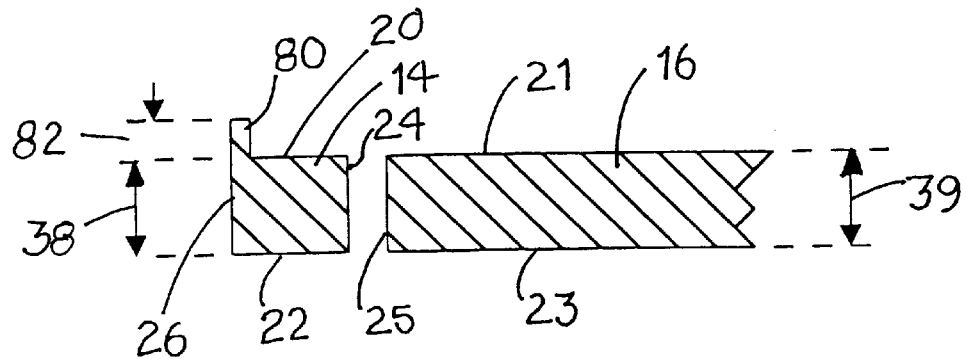
FIG_4
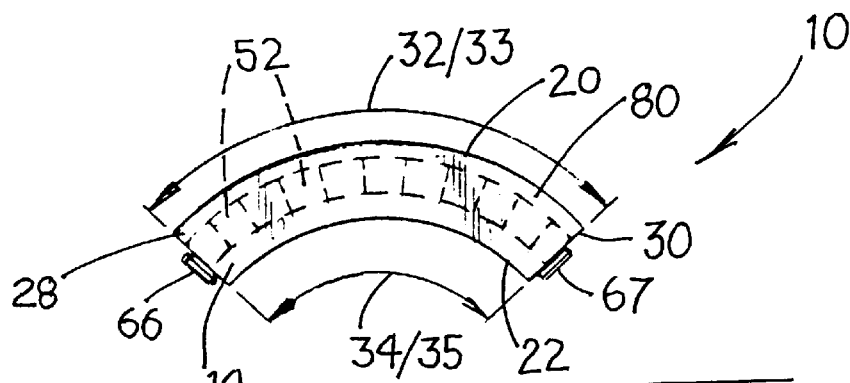
FIG_5
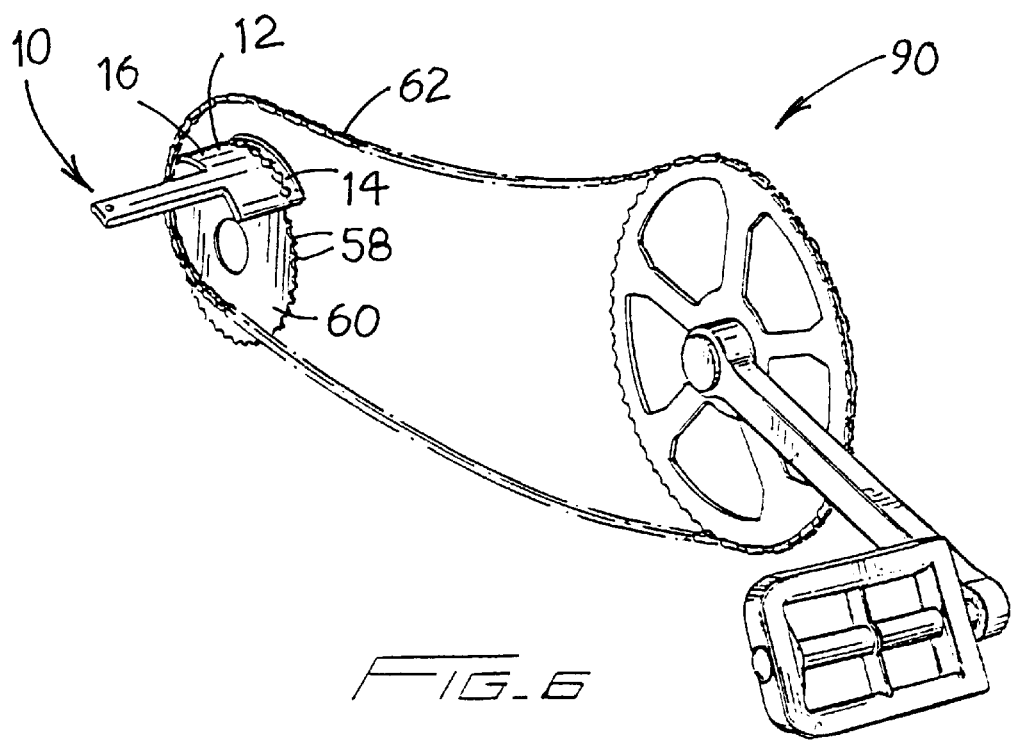
FIG_6

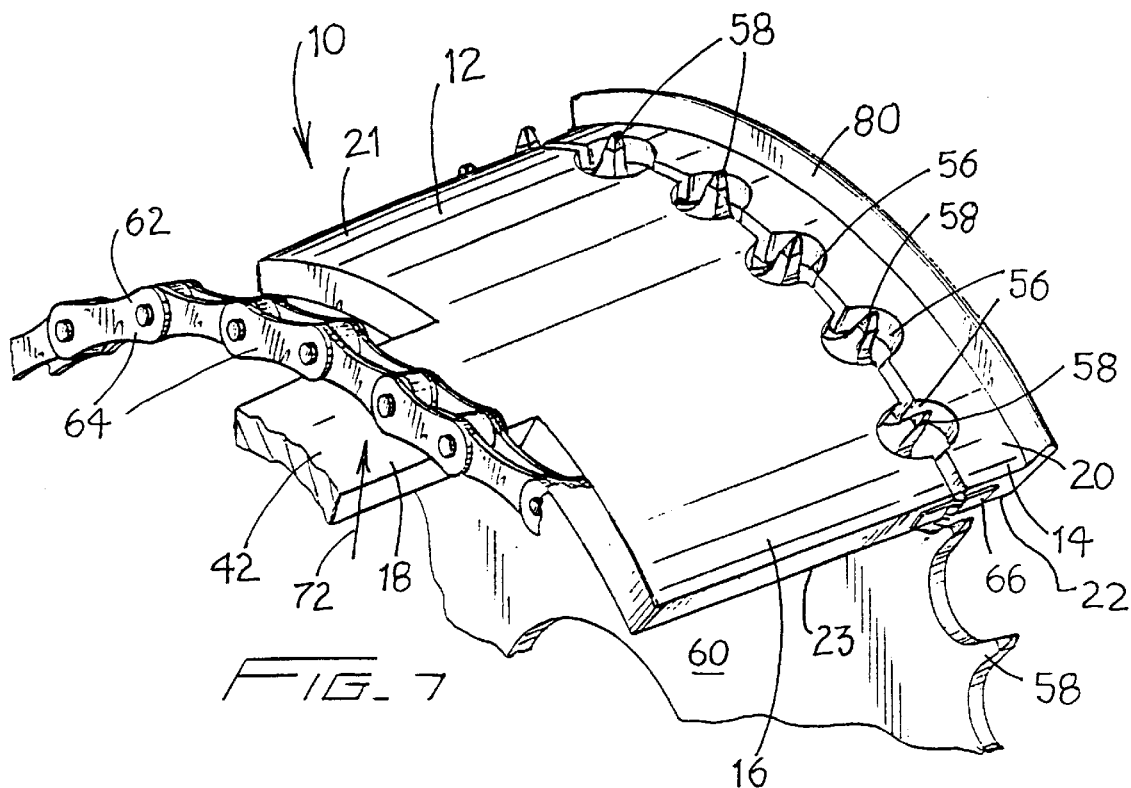
FIG_7
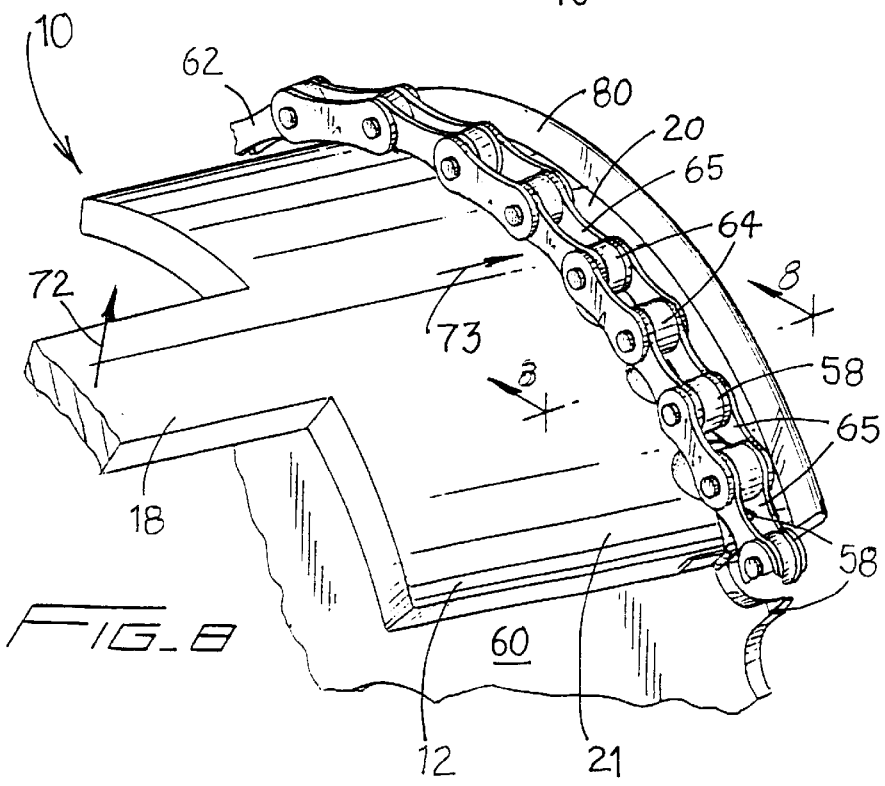
FIG_8

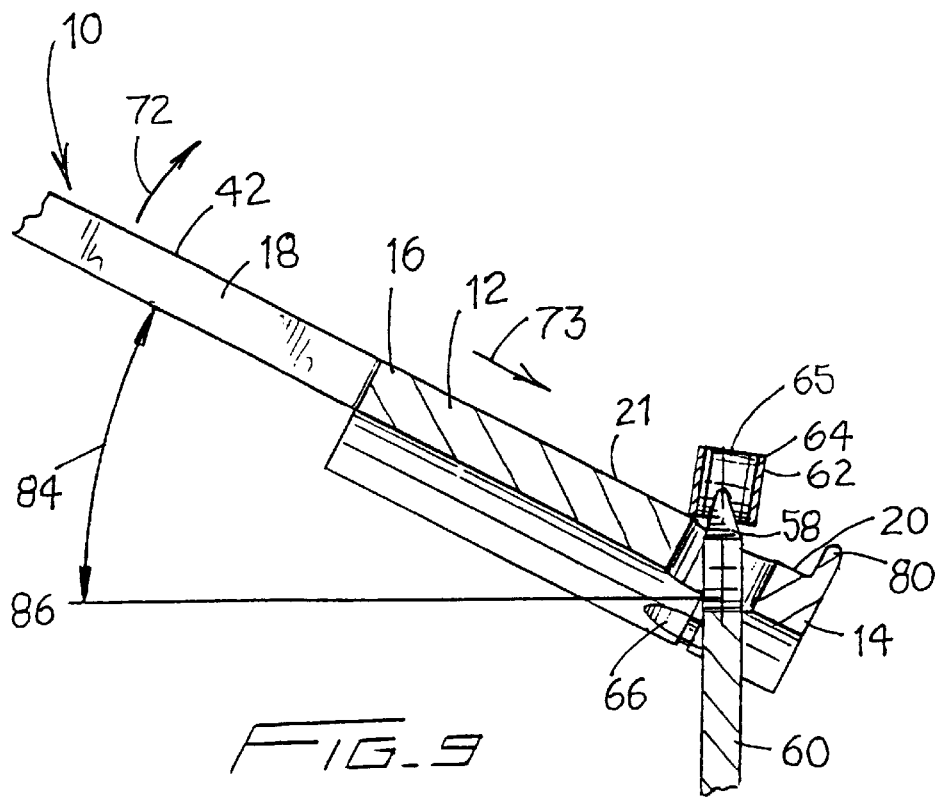
FIG_9
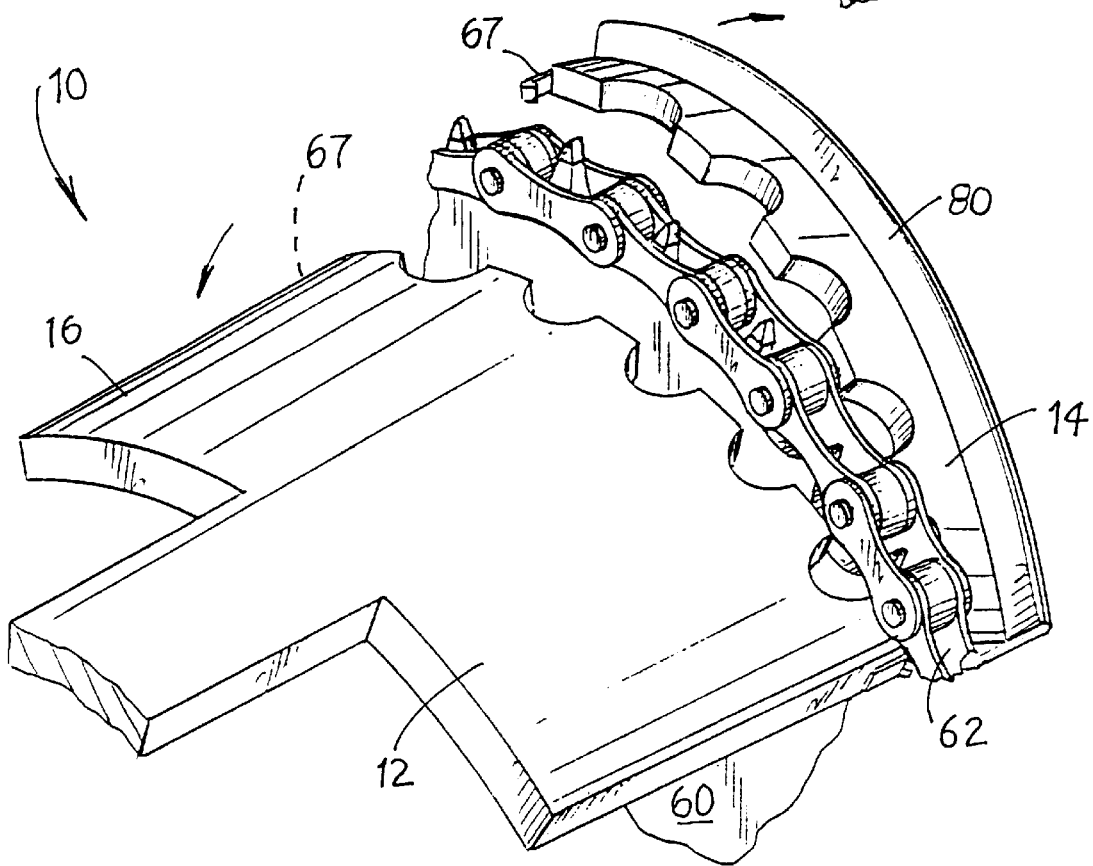
FIG_10

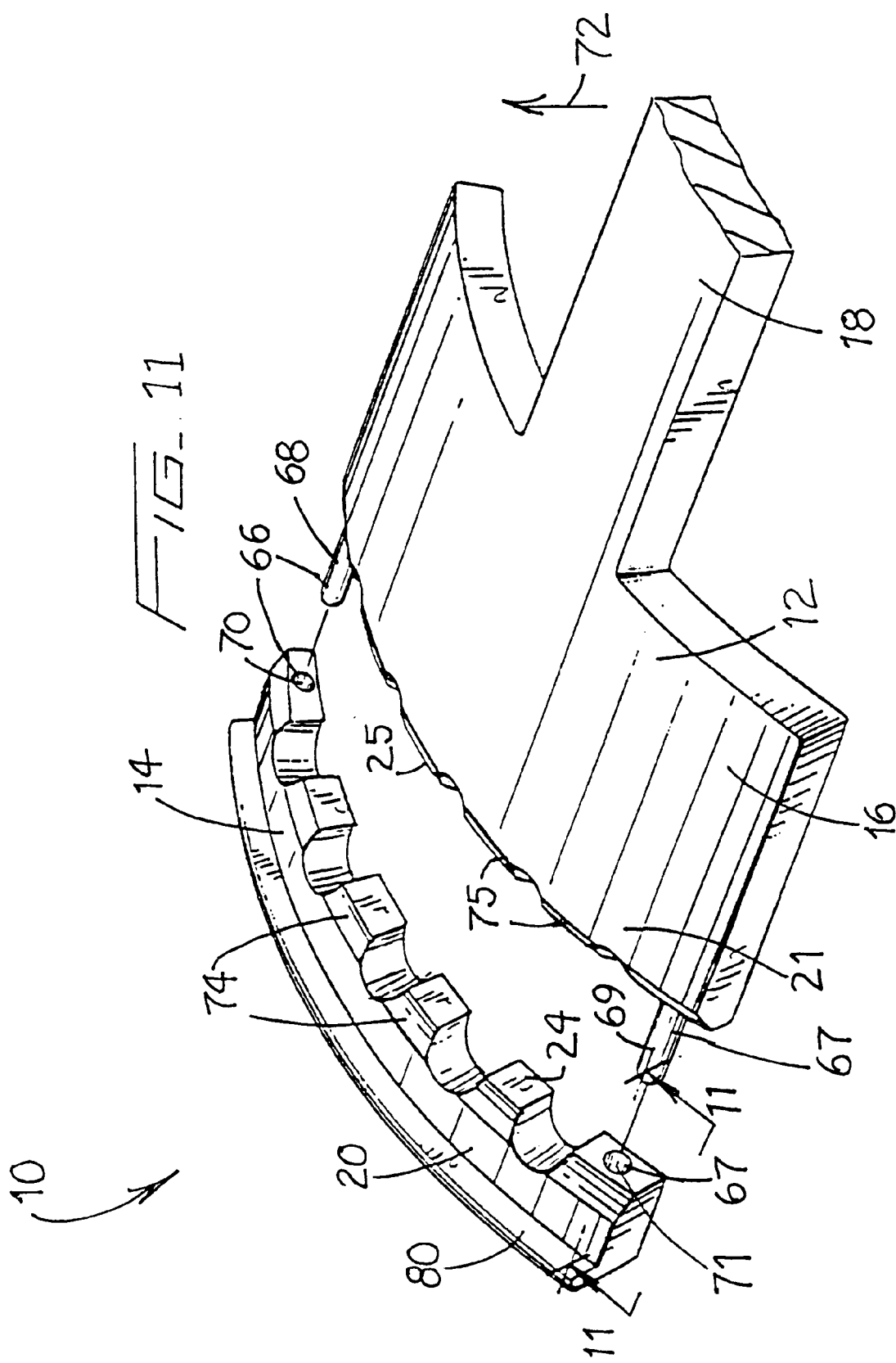

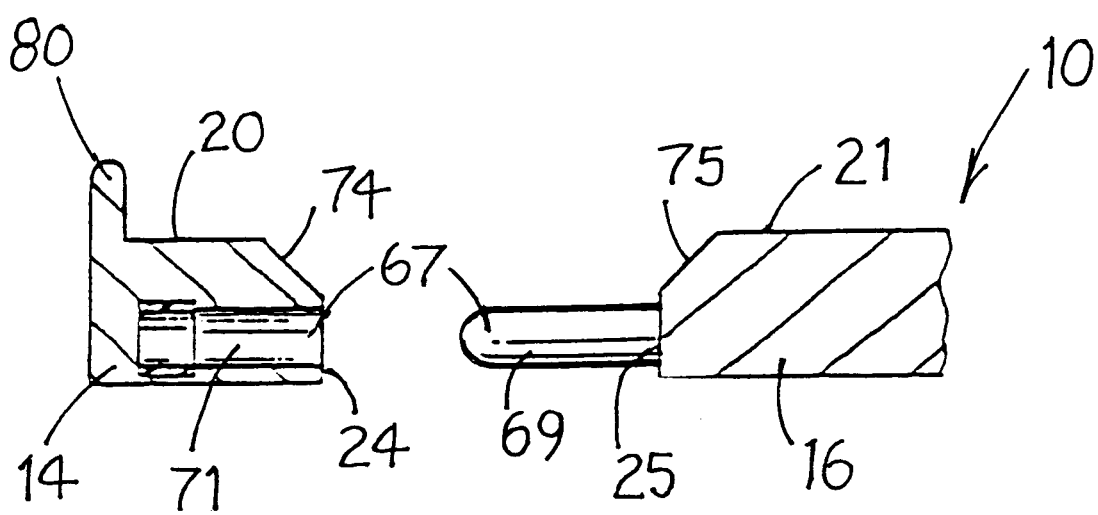
FIG_12

TOOL FOR MOUNTING A CHAIN ON A SPROCKET

FIELD OF THE INVENTION

The present invention relates to a tool for mounting a chain onto a chain sprocket, such as that of a bicycle or motorcycle.

BACKGROUND OF THE INVENTION

One of the most frustrating problems that a bicyclist can run into when they are out on the road or trail is having their bicycle chain de-rail and slip off its track. Not only does the cyclist face the inconvenience of having to stop and struggle to put the chain back on the chain sprocket, but they also have to deal with the greasy mess that the chain leaves on their hands and clothing.

Therefore, it is an object of the invention to provide a tool that can be used to easily and quickly remount a de-railed chain onto a chain sprocket. Another object is to provide a hand tool for mounting a chain on a chain sprocket that is durable, portable, compact and lightweight. Yet another object is to provide a chain mounting tool that is lightweight and compact, and can be mounted onto the frame of a bicycle to provide ready access to a cyclist should problems arise while riding.

SUMMARY OF THE INVENTION

These and other objects are achieved in the present invention of a tool for use in mounting a chain onto a multi-toothed drive or chain sprocket. The chain mounting tool is a hand-held device that allows the user to quickly and easily replace a derailed chain onto a chain sprocket without getting greasy.

The chain mounting tool includes a two-part clamping member with an attached handle. The two sections of the clamping member are rectangular-shaped, each with a first and second face or surface, an inner and outer surface, and opposing ends. The sections can be hinged at one end and releasably fastened together at the other end, or releasably attached at both ends. The inner surfaces of the two sections of the clamping member include a series of corresponding grooves or channels that extend from the first to the second surfaces. When the two sections are brought together, the grooves on the inner surfaces pair up to form a series of bores. Each bore is sized to receive a tooth of the chain sprocket therethrough.

The shape of the two sections of the clamping member is preferably arched to conform substantially to the curve (arc) of the chain sprocket so that, when the clamping member is placed onto the sprocket, each of the bores of the tool will receive a tooth of the sprocket therethrough. This better facilitates placement and mounting of the chain onto the sprocket.

The tool can be used for mounting a chain onto a chain sprocket of a bicycle, motorcycle, chainsaw, or other device that is driven by a chain-and-sprocket mechanism. To use, the chain is placed on top of the handle of the chain mounting tool, and the tool is placed on the chain sprocket so that the teeth of the sprocket are inserted through the bores of the clamping member. The handle of the tool is then lifted to slide the chain toward and onto the sprocket. Preferably, the first section of the clamping member includes a wall or other barrier as a backstop to prevent the chain from sliding off the tool when it is lifted up. With the teeth of the sprocket are engaged in the holes of the chain, the fastener(s) securing the two sections of the clamping member together is then disengaged to open and release the tool from the sprocket with the chain securely mounted on the sprocket.

The present tool advantageously provides a device that can be used to quickly and easily mount a de-railed chain onto a chain sprocket. Another advantage is that the tool can be used to remount a greased chain onto a sprocket with little or no actual touching of the chain with the hands. In addition, the tool is a simple design that can be readily manufactured, and is easy for the consumer to handle and maneuver.

Further objects and advantages of the present invention will become more apparent from the following detailed description of the chain mounting tool, taken in combination with the accompanying drawings.

BRIEF DESCRIPTION OF THE DRAWINGS

Throughout the following views, reference numerals will be used on the drawings, and the same reference numerals will be used throughout the several views and in the description to indicate same or like parts of the invention.

FIG. 1 is a perspective view of an embodiment of a chain mounting tool according to the present invention;

FIG. 2 is a top, plan view of the chain mounting tool of FIG. 1;

FIG. 3 is a side elevational view of the chain mounting tool of FIG. 1, showing the hinge;

FIG. 4 is a side cross-sectional view of the two sections of the chain mounting tool of FIG. 2 taken along lines 4—4.

FIG. 5 is a front elevational view of the chain mounting tool of FIG. 1;

FIG. 6 is an illustration of the chain mounting tool of FIG. 1 in place on a chain sprocket of a bicycle for reattachment of a de-railed chain;

FIG. 7 is an enlarged, perspective view of a portion of FIG. 4, showing the chain mounting tool in place on the chain sprocket with the chain positioned on the handle of the tool;

FIG. 8 is a perspective view of the chain mounting tool and the chain in place on a portion of the chain sprocket;

FIG. 9 is a cross-sectional view of FIG. 7 taken along line 8—8, and showing the chain mounting tool and the chain in place on the chain sprocket;

FIG. 10 is a perspective view of the chain mounting tool in an open position with the chain in place on a portion of the chain sprocket.

FIG. 11 is a perspective view of another embodiment of the chain mounting tool having beveled edges and a pin with a locking retainer to releasably fasten the two sections together; and FIG. 12 is a side cross-sectional view of the chain mounting tool of FIG. 10 taken along lines 11—11.

DETAILED DESCRIPTION OF THE INVENTION

Referring now to the drawings, an embodiment of a chain mounting tool according to the invention, generally designated with the numeral 10, is shown in perspective in FIG. 1.

The chain mounting tool 10, as depicted in FIGS. 1–5, includes a clamping member 12 made of first and second rectangular-shaped sections 14, 16, and a handle 18. Each section 14, 16, respectively, has a first face or surface 20, 21, a second surface 22, 23, an inner surface 24, 25, an outer surface 26, 27, a first end 28, 29, and a second end 30, 31. The first surfaces 20, 21, respectively, have a length 32, 33, and the second surfaces 22, 23, respectively, have a length 34, 35. Each section 14, 16 also has a width 36, 37, a height or thickness 38, 39, and a lengthwise axis 40, 41, respectively.

The handle 18 has a first surface 42, a second surface 44, a first end 46, and a second end 48. The first end 46 of the handle 18 is secured to the outer surface 27 of the second rectangular section 16. As shown in FIG. 2, the longitudinal axis 50 of the handle 18 is oriented perpendicular to the lengthwise axis 41 of the second section 16 of the clamping member 12.

The inner surfaces 24, 25, respectively, include a plurality of grooves or channels 54, 55. The grooves 54, 55 extend from the first surface 20, 21 to the second surface 22, 23, respectively. When the inner surfaces 24, 25 of the first and second rectangular sections 14, 16 are brought together into a juxtaposed relation as depicted in FIG. 2, the grooves 54, 55 on the opposing inner surfaces 24, 25, couple to form a plurality of bores 56.

The diameter of each of the bores 56 of the clamping member 12 is sufficient to receive the teeth 58 of the chain sprocket 60 therethrough, as shown in FIG. 7. It is preferred that the diameter of each of the bores 56 is larger than the teeth 58 of the chain sprocket 60, and sufficient to enable the tool 10 to move or pivot about the teeth 58. This allows the tool 10 to be tilted so that the chain 62 will slide downward onto the sprocket 60, as shown in FIGS. 8 and 9.

It is preferred that the first and second sections 14, 16 of the clamping member 12 are arch-shaped to conform to the contour or curvature of the chain sprocket 60. As such, when the clamping member 12 is placed onto the chain sprocket 60 (FIGS. 6 and 7), the teeth 58 of the sprocket 60 are inserted through each the bores 56 of the tool 10. This better facilitates mounting the chain links 64 of the chain 62 onto the teeth 58 of the chain sprocket 60.

The first and second sections 14, 16 of the clamping member 12 are releasably connected in a juxtaposed position by one or more fastening members. For example, as shown in FIGS. 1–3, the first ends 28, 29 of the rectangular sections 14, 16 are pivotally attached by a fastener 66 in the form of a hinge. The second ends 30, 31 are attached by a fastener 67 that can be releasably connected to secure the two sections 14, 16 together.

Preferably, the clamping member 12 has releasable fasteners 66, 67 connecting both ends (28/29; 30/31) so that sections 14, 16 can be completely disconnected and separated. This provides for ready removal of the tool 10 from the chain sprocket 60 after the chain 62 has been re-mounted. Examples of such fasteners include a bolt, pin, threaded fastener or other rod-like body that is releasably inserted into a mating nut, socket holder or other fitting.

Another example of a releasably connectable fastener is shown in FIGS. 11 and 12. As shown, fasteners 66, 67 are in the form of rod-like members 68, 69 (e.g., pressure sensitive registration pins) mounted on the inner surface 25 of the second section 16 that are inserted into or mate with releasably locking retainer clips 70, 71 mounted in the inner surface 24 of the first section 14. The pins 68, 69 can be disengaged from the locking retainers 70, 71 by moving the second section 16 in an upwardly direction, shown by arrow 72. Preferably, the edges 74, 75 of the inside surfaces 24, 25 (adjacent to the first surfaces 20, 21) are beveled so that when an upwardly force (arrow 72) is applied to the second section 16 of the clamping member 12, the angle of the second section 16 to the first section 14 is sufficient to cause the rods or pins 68, 69 to be released from the locking mechanism 70, 71.

Optionally, but preferably, the first section 14 of the clamping member 12 includes a wall or other barrier structure 80 as a backstop to prevent the chain 62 from sliding off the clamping member 12 when the tool 10 is in use and tilted. As depicted in FIG. 4, the tool 10 includes a barrier wall 80 positioned at the junction between the outer surface 26 and the first surface 20. Preferably, the height 82 of the barrier 80 is sufficient to retain the chain 62 on the clamping member 12 when the tool 10 is lifted to an angle 84 of about 30–45° relative to an axis 86 perpendicular to the chain sprocket 60 (FIG. 9). The barrier member 80 preferably has a height 82 of about 0.2–0.5 inch.

The shape and dimensions of the clamping member 12 of the chain mounting tool 10 can be varied to accommodate chain sprockets 60 of various sizes and numbers and spacing of teeth. For example, for use with a standard, 42–46 tooth, 94-mm diameter chain sprocket of a bicycle, the clamping member 12 is preferably arch-shaped as shown in FIGS. 1–5, with the first surfaces 20, 21 having a length 32, 33 of about 2–5 inches, preferably about 3–4 inches, more preferably about 3.5 inches; and the second surfaces 22, 23 having a length 34, 35 of about 2–4 inches, preferably about 2–3 inches, more preferably about 2.5 inches. It is further preferred that the clamping member 12 has a total width (36+37) of about 0.4–1.0 inch, preferably about 0.5–0.7 inch; a bore 56 diameter of about 0.2–0.6 inch, preferably about 0.4–0.5 inch; and a height or thickness 38, 39 of about 0.2–0.5 inch, preferably about 0.4–0.5 inch.

The tool 10 can be manufactured from materials known and used in the art, and is preferably fabricated from a durable, lightweight metal alloy or plastic.

The tool 10 can include a component for mounting the tool onto a support structure, such as a pegboard, nail board, bicycle frame, chainsaw frame, and the like. For example, as shown in FIGS. 1 and 2, the handle 18 of the tool 10 can include an aperture 88 through which a peg or hook that is mounted on a support can be inserted (not shown). The handle 18 can also be structured to couple with a cage, clamp, or other carrier that is mounted on a support structure such as a bicycle frame (not shown).

The chain mounting tool 10 can be packaged as part of a kit in association with instructions (e.g., written, audio, video) for using the tool 10 to mount a de-railed chain onto a chain sprocket. The tool 10 can also be packaged in combination with a cage or other carrier, that can be mounted, for example, on a bicycle frame for ready access to the user. The various parts of the kit can be packaged separately and contained within a box or other packaging material.

Operation. The tool 10 can be used to mount a chain 62 onto a drive or chain sprocket 60 of a bicycle, motorcycle, chainsaw, garage door chain, or other like device that is driven by a chain 62 mounted on a multi-toothed sprocket 60. An example of the use of the tool 10 to mount a de-railed chain 62 onto the chain sprocket 60 of a bicycle chain and sprocket assembly 90 is illustrated in FIGS. 6–10.

As shown in FIGS. 6 and 7, the chain mounting tool 10 is initially employed with the first and second sections 14, 16 of the clamping member 12 secured together in a closed position by the fasteners 66, 67. In the use of the tool 10 depicted in FIGS. 11 and 12, sections 14 and 16 are connected together by inserting the registration pins 68, 69 into the retainer clips 70, 71, respectively. A portion of the de-railed chain 62 is placed onto the first surface 42 of the handle 18 of the chain mounting tool 10. The clamping member 12 is then placed onto the chain sprocket 60 so that second surfaces 22, 23 of the clamping member 12 are oriented toward the sprocket 60, and the teeth 58 of the sprocket 60 are inserted through the bores 56 of the clamping member 12.

Referring to FIGS. 8 and 9, the tool handle 18 is then lifted in the direction of arrow 72 to an about 30–45° angle 84 to cause the chain 62 to slide down the handle 18 in the direction of arrow 73, and up and onto the sprocket 60. The teeth 58 of the sprocket 60 are inserted into the holes 65 of the chain links 64 and the chain 62 rests on the first surfaces 20, 21 of the clamping member 12. If needed, the chain sprocket can be rotated to assist in mounting the chain thereon.

As depicted in FIG. 10, once the chain 62 is mounted onto the sprocket 60, the fastener 67 is disengaged to separate the first and second sections 14, 16 of the clamping member 12. In the use of the tool 10 shown in FIGS. 11 and 12, sections 14, 16 can be completely disengaged by moving handle 18 and section 16 in the direction of arrow 72 to disengage the pins 68, 69 from the retainers 70, 71. The chain mounting tool 10 is then removed from the chain sprocket 60, wherein the chain 62 remains mounted on the sprocket 60 as shown in FIG. 10.

The invention has been described by reference to detailed examples and methodologies. These examples are not meant to limit the scope of the invention. Variation within the concepts of the invention are apparent to those skilled in the art. The disclosures of the cited references throughout the application are incorporated by reference herein.

What is claimed is:

1. A tool for mounting a chain on a multi-toothed chain sprocket, comprising:
    (a) a clamping member having first and second sections; each section having opposing first and second surfaces, inner and outer surfaces, and first and second ends; the inner surfaces of the first and second sections having a plurality of grooves extending from the first to the second surfaces; and one or both of the ends of the sections including a fastener operable to releasably connect the sections together with the inner surfaces of the sections positioned in a juxtaposed relation and the grooves on the opposing inner surfaces coupled to form a plurality of bores, each bore sized for receiving a tooth of the chain sprocket therethrough; and
    (b) a handle having a first surface and a second surface, and attached to the outer surface of the second section.

2. The chain mounting tool according to claim 1, wherein the first and second sections of the clamping member are arch-shaped.

3. The chain mounting tool according to claim 2, wherein the first and sections of the clamping member conform to the contour of the chain sprocket.

4. The chain mounting tool according to claim 1, wherein the bores are sized larger than the teeth of the chain sprocket.

5. The chain mounting tool according to claim 4, wherein the bores have a width of about 0.2–0.6 inch.

6. The chain mounting tool according to claim 1, wherein both ends of the sections include a releasably connectable fastener.

7. The chain mounting tool according to claim 1, wherein the fastener comprises a rod-like member mounted on the inner surface of the first section, and a retaining clip mounted on the inner surface of the second section for releasably holding the pin when inserted therein; the fastener operable to disconnect the first and second sections of the clamping member when an upwardly force is applied to the second section of the clamping member.

8. The chain mounting tool according to claim 7, wherein each of the inner surfaces of the sections have a beveled edge adjacent to the first surface.

9. The chain mounting tool according to claim 1, wherein the tool comprises a hinged fastener attached to the first or second ends of the sections.

10. The chain mounting tool according to claim 1, wherein the clamping member further comprises:
    a barrier extending from the first surface of the first section of the clamping member, and operable to retain the chain placed on the clamping member when the clamping member is oriented at an about 30–45° angle.

11. The chain mounting tool according to claim 10, wherein the barrier has a height of about 0.3–0.8-inch.

12. The chain mounting tool according to claim 1, wherein each of the first and second sections have a length of about 2–5 inches, a width of about 0.4–1.0 inches, and a height of about 0.1–0.6 inch.

13. The chain mounting tool according to claim 2, wherein the first surface of each of the sections has a length of about 3–4 inches, and the second surface of each of the sections has a length of about 2–3 inches.

14. The chain mounting tool according to claim 1, wherein the tool is sized for use with a chain sprocket of a bicycle, motorcycle, chainsaw, or garage door opening mechanism.

15. A method of mounting a chain on a multi-toothed chain sprocket, comprising:
    (a) providing a chain mounting tool according to claim 1, with the fastener engaged to connect the first and second sections of the clamping member in a juxtaposed position;
    (b) positioning the chain on the first surface of the handle of the tool;
    (c) placing the tool on the chain sprocket with the second surface of the clamping member oriented toward the sprocket and the teeth of the sprocket inserted through the bores of the clamping member;
    (d) lifting the handle of the tool to slide the chain onto the teeth of the sprocket and the clamping member of the tool to mount the chain on the chain sprocket;
    (e) disengaging the fastener of the tool to disconnect the first and second sections of the clamping member; and
    (f) removing the tool from the chain sprocket and the chain mounted on the chain sprocket.

16. The method of claim 15, wherein step (e) comprises applying a force to the handle and the second section of the clamping member to disengage the releasable fastener and separate the first and second sections.

17. The method of claim 15, further comprising:
    (g) rotating the chain sprocket to mount an adjacent portion of the chain thereon.

\* \* \* \* \*